United States Patent [19]

Zimmerman

[11] 4,233,867

[45] Nov. 18, 1980

[54] MULTIPLE INSERT TOOL ASSEMBLY FOR THREADING, GROOVING AND THE LIKE

[75] Inventor: William R. Zimmerman, Califon, N.J.

[73] Assignee: General Electric Company, Detroit, Mich.

[21] Appl. No.: 966,573

[22] Filed: Dec. 5, 1978

[51] Int. Cl.³ .................. B23B 29/00; B23G 1/00; B26D 1/12

[52] U.S. Cl. .................. 82/36 R; 10/101 R; 407/70; 407/113

[58] Field of Search .................. 407/70, 117, 113; 82/36 R; 10/101, 110

[56] References Cited

U.S. PATENT DOCUMENTS

| | | | |
|---|---|---|---|
| 180,409 | 8/1876 | Alvord | 407/70 |
| 3,163,918 | 1/1965 | Emmons | 407/117 |
| 3,245,288 | 4/1966 | Fried | 407/117 |
| 3,455,002 | 7/1969 | Miller | 407/70 |
| 3,466,721 | 9/1969 | Binns | 407/70 |
| 3,780,409 | 12/1973 | Bartoszevicz | 407/117 |
| 4,063,841 | 12/1977 | Niman, Jr. | 407/70 |

Primary Examiner—Harrison L. Hinson
Attorney, Agent, or Firm—Morgan, Finnegan, Pine, Foley & Lee

[57] ABSTRACT

A tool assembly includes a plurality of tool bit inserts, each having a cutting edge formed on at least one end of the insert, the insert being securely clamped to the head portion of a shank which is mountable to a machine tool, with the cutting edges of the inserts projecting outwardly from an edge of the shank in an ascending staggered configuration starting with the first cutting edge to contact the workpiece. As preferably embodied, the shank has a cut-out in its front end, providing a seating surface to support the inserts and a bearing surface segment for each insert to abut the back edge of its corresponding inserts, the segments being formed in an ascending step-like configuration to provide the stagger for the cutting edges of the inserts.

8 Claims, 13 Drawing Figures

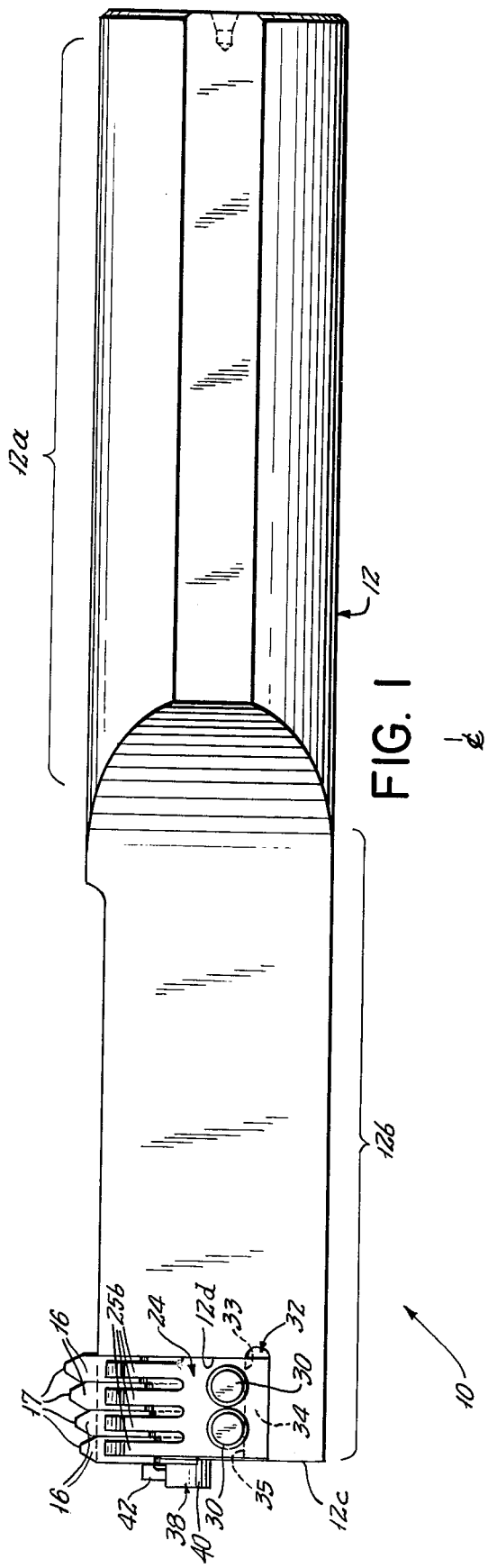
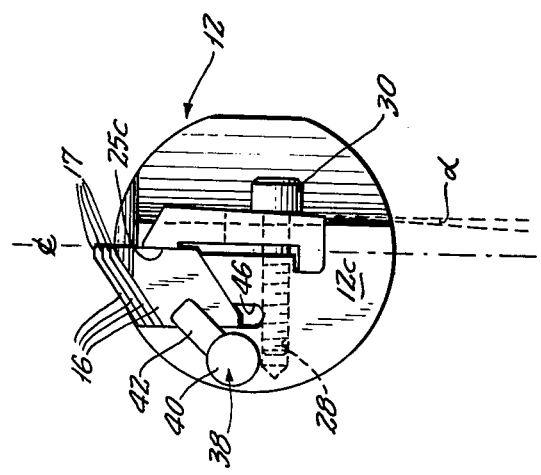
FIG. 1
FIG. 2

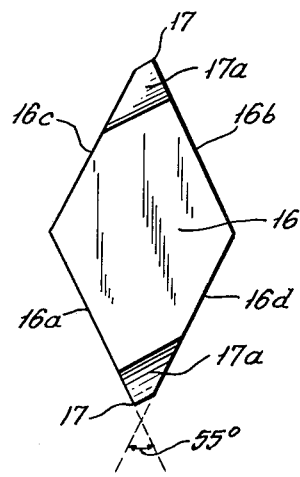 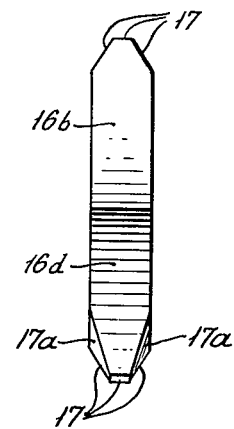
FIG. 8   FIG. 9
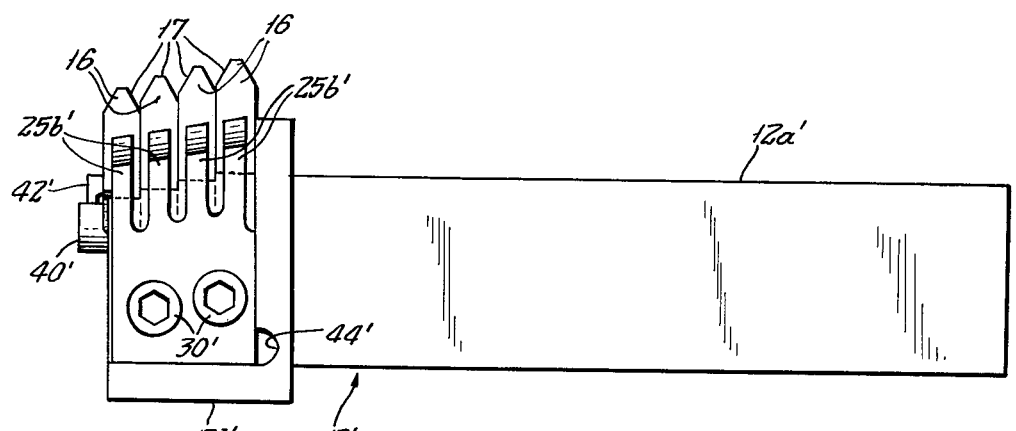
FIG. 10
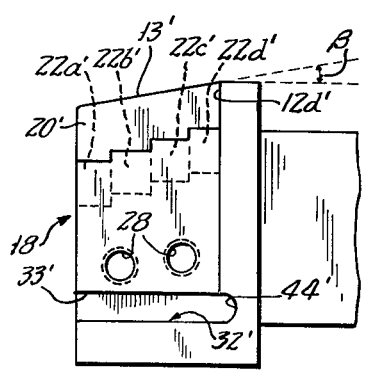 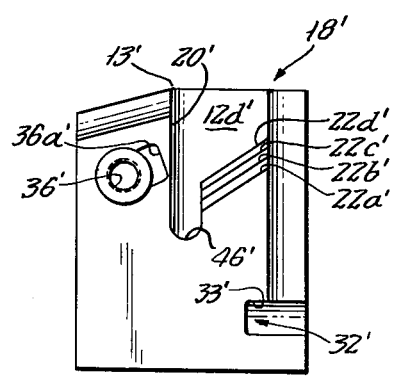 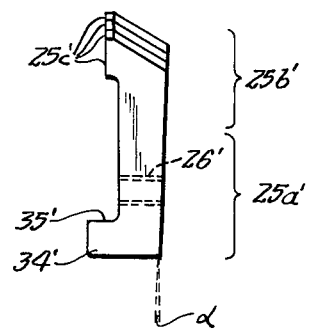
FIG. 11   FIG. 12   FIG. 13

MULTIPLE INSERT TOOL ASSEMBLY FOR THREADING, GROOVING AND THE LIKE

BACKGROUND AND OBJECTS OF THE INVENTION

The present invention relates generally to machine tools and, more particularly, to a new and improved tool assembly for threading a workpiece.

The art is replete with machine tools, such as lathes and the like, adapted to rotate a workpiece such as a bar, pipe, bolt or other structure having an interior surface, or an exterior surface, which is to be threaded or otherwise formed with a helical groove. In such machine tools, a tool bit insert having a cutting edge made of a hardened material (such as tungsten-carbide) is clamped to a relatively massive shank member which, in turn, is securely mounted to the machine. The workpiece (which is mounted to another portion of the machine for rotation relative the cutting edge) and the insert cutting edge are brought together so that as the workpiece is rotated, the cutting edge of the insert cuts the threads or grooves in the desired surface.

In typical threading tool arrangements, a single tool bit insert is clamped to a shank (such as a boring bar shank) and the workpiece is rotated past the cutting edge of the insert to form a helical groove in the workpiece and define the desired threading configuration. After an initial groove is cut, the tool bit is brought back to its initial starting point and the process is repeated except that the insert cutting edge is re-positioned slightly for cutting slightly deeper into the workpiece on the next pass. The tool bit then makes numerous (15 or more depending on the depth of the groove and the hardness of the workpiece) successively deeper passes until the thread-groove has been cut to the desired depth. Although this approach has provided adequate results, it does entail a tedious and time-consuming procedure, resulting in unnecessary expense due to the inordinate number of repetitions of the machining step.

In an effort to improve the threading operation, there have been attempts to make a tool bit insert having several cutting edges by grinding the edges onto a single insert blank. The cutting edges are spaced to follow each other in the resultant groove cut in the workpiece and, like the single insert arrangement, are passed repeatedly over the workpiece, each time cutting a little deeper into the workpiece. Although such multiple-cutting-edge insert arrangements provide better defined grooves than a single-edge insert arrangement, it is limited in that if one cutting edge is damaged, the entire insert must be replaced while the depth and spacing of resultant thread-grooves is also limited. Moreover, it still requires about the same number of passes as the single insert.

It is, therefore, an object of the present invention to provide a new and improved tool assembly for machine tools and the like. It is another object of the invention to provide a new and improved tool assembly for forming threads or similar continuous grooving on a workpiece.

It is also an object of the present invention to provide a new and improved tool assembly for forming thread or the like on a workpiece, which forms the desired groove pattern on the workpiece with fewer (at least 50% fewer) repetitions of the machining step as compared with a single cutting edge threading tool.

It is a further object of the present invention to provide a new and improved tool assembly for forming threads or the like on a workpiece, which enables easy interchange or replacement of any one cutting edge without requiring replacement of all edges.

It is yet another object of the present invention to provide a new and improved tool assembly for forming threads or the like on a workpiece, wherein each tool bit insert is urged into further engagement with the back-stop bearing surface of the shank while engaged in the machining operation.

It is also an object of the invention to provide a new and improved tool assembly for threading or the like, which enables variations in the depth of the resultant groove as well as in the spacing between adjacent grooves.

It is still another object of the invention to provide a new and improved tool assembly for threading or the like, which enables the use of multiple identical inserts while minimizing the time for and repetitions of the machining steps and which provides automatic indexability of the tool assembly.

Objects and advantages of the invention are set forth in part herein and in part will be appreciated herefrom, or may be learned by practice with the invention, the same being realized and attained by means of the instrumentalities and combinations pointed out in the appended claims. Accordingly, the invention resides in the novel parts, constructions, arrangements, combinations and improvements herein shown and described.

SUMMARY OF THE INVENTION

Briefly described, the tool assembly according to the present invention includes a plurality of (preferably four) tool bit inserts, each having a cutting edge on at least one end and being securely clamped to a generally elongate shank member, which adapted to be mounted to a suitable machine tool, with the cutting edges of successive inserts (i.e., beginning with the first cutting edge to contact the workpiece) projecting outwardly from an edge of the shank in an ascending staggered configuration. The shank has a cut-out, or pocket, in its front end, providing a seating surface to support the inserts and a bearing surface which acts as a back-stop against which the back end edge of the inserts bear during the tooling operation. As preferably embodied, the bearing surface is formed in a plurality of segments, each segment corresponding to an insert, which are staggered in step-like configuration to provide the ascending staggered configuration for the insert cutting edges. The bearing surface segments are also preferably formed at an acute angle relative to the seating surface and the back end edge of each insert is formed with a corresponding angular configuration.

In one embodiment, the bearing surface segments extend generally to the longitudinal axis of the shank so that the inserts extend perpendicular to that axis. All the inserts are clamped from above the seating surface by a single clamp, preferably a "piano"-like clamp having a plurality of clamping fingers, each corresponding to one insert. In a modified embodiment, the edge of the seating surface over which the cutting edges of the inserts project extends at generally the same angle as the angle which corresponds to the step-like stagger of the bearing surface segments, while the lengths of the clamping fingers also project to progressively longer lengths to correspond generally to the step-like stagger of the bearing surface segments.

It will be apparent from the foregoing general description that the objects of the invention specifically enumerated herein are achieved by the invention as herein disclosed. Thus, a tool assembly made in accordance with the present invention will be relatively easy and inexpensive to fabricate. Assembly thereof and, particularly, replacement of worn or damaged parts (especially worn tool bit cutting edges) can be made very quickly and easily.

It will also be found that the tool assembly according to the present invention permits replacement of any worn or damaged cutting edge(s), without requiring replacement of the other cutting edges which may, therefore, continue in use. Moreover, but utilizing the staggered step-like arrangement of the bearing surface segments on the shank to provide the ascending configuration of cutting edges it will be found that identically formed inserts may be used with the tool assembly for ease of replacement, extreme flexibility in achieving the desired configuration for the resultant thread configuration and automatic indexability of the cutting edges.

It will further be found that by angling the bearing surface segments at an acute angle with respect to the seating surface, the inserts will be further urged into engagement with their bearing surface segments during operation of the machine tool.

It will also be found that by angling the edge of the seating surface over which cutting edges project, with progressively lengthened clamping fingers, the area of seating surface under each insert will be clamped at essentially the same corresponding locations thereon.

It will be understood that the foregoing general description as well as the following detailed description are exemplary and explanatory of the invention and are not intended to be restrictive thereof. Accordingly, the accompanying drawings, referred to herein, and constituting a part hereof, illustrate preferred embodiments of the invention and, together with the detailed description, serve to explain the principles of the invention.

BRIEF DESCRIPTION OF DRAWINGS

FIG. 1 is a plan view of an embodiment of a threading tool according to the present invention.

FIG. 2 is an end view of the tool shown in FIG. 1.

FIG. 8 is a side view of a double-ended tool bit insert used with the embodiments shown herein.

FIG. 9 is a plan view of the insert shown in FIG. 8.

FIG. 10 is a plan view of an embodiment of a threading tool according to another aspect of the invention.

FIG. 11 is a plan view (similar to FIG. 10) of a portion of the shank shown in FIG. 10.

FIG. 12 is an end view of the shank shown in FIG. 11.

FIG. 13 is a side view of the clamp used with the embodiment shown in FIG. 10.

DETAILED DESCRIPTION OF PREFERRED EMBODIMENTS

Figure 3:
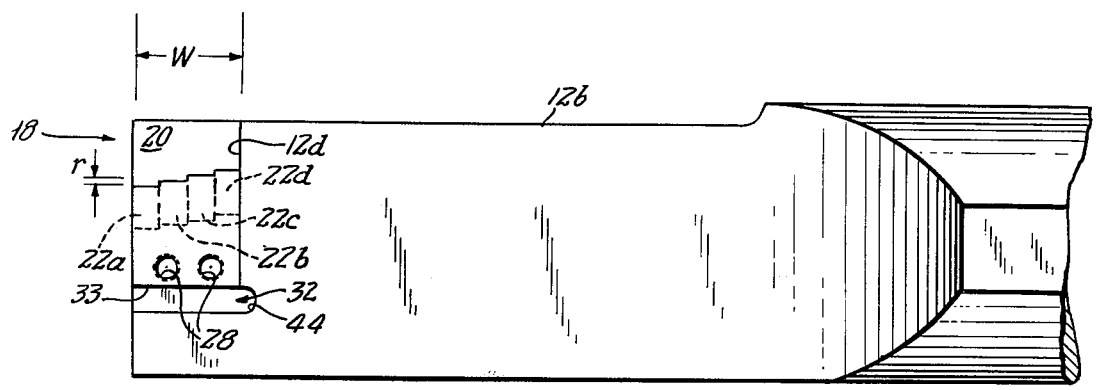
FIG. 3 is a plan view (similar to FIG. 1) of a portion of the shank shown in FIG. 1.

Referring now generally to the embodiments of the present invention shown in the accompanying drawings, wherein like reference numbers designate like parts throughout the various views, FIGS. 1–9 illustrate various views of the components making up a tool assembly (indicated generally at 10) made in accordance with the present invention, for threading or forming a continuous groove in a workpiece.

As here embodied, tool assembly 10 includes a generally elongate and relatively heavy shank (12), here a boring bar shank, adapted to be secured (by its butt or back end, 12a) to a suitable machine tool (not shown) for threading a surface (invariably, the interior surface) of a nut, pipe or the like, (hereinafter, the "wordpiece" which is not shown) and a cutting assembly (indicated generally at 14) adapted to be mounted to the head or front end (12b) of the shank for positioning adjacent the workpiece during the machining operation. According to the invention, cutting assembly 14 includes a plurality of individual tool bit inserts (each designated 16), each having one cutting edge (17) formed on at least one end and adapted to cut into or form the desired thread pattern in the workpiece. As will be described more fully with reference to FIGS. 8 and 9, each cutting edge (17) is generally V-shaped but with a small (approx. 0.03") flat segment at the vertex of the "V."

Also according to the invention, the shank (12) and head assembly (14) are adapted to locate the cutting edges (17) of the inserts (16) in an ascending (beginning with the first insert to contact the workpiece) staggered configuration, as shown in FIG. 1, with the cutting edges projecting outwardly from a side of the shank for interior threading. To this end and as here embodied, the front portion (12b) of shank 12 is formed with a cut-out, or pocket (designated generally at 18 in FIGS. 3–5), proportioned to provide both a seating surface (designated 20) for supporting the inserts and bearing surface means (described more fully below) to act as a back-stop against which the back edges of the inserts bear during the machining operations. Seating surface 20 is preferably planar so that when all the inserts (16) are fully seated thereon, all the cutting edges (17) will be at essentially the same height and will be essentially co-planar.

As preferably embodied, the bearing surface means are proportioned and positioned to provide the ascending stagger-like configuration for all the insert cutting edges (17). For this purpose, the bearing surface means are divided into a plurality of bearing surface segments (designated 22a, 22b, 22c and 22d), each bearing surface segment corresponding to one tool bit insert, and are formed in step-like ascending order. The "rise" (indicated at r in FIG. 3) from one surface segment to the next is equal to the increase in depth of penetration into the workpiece desired from one cutting edge to the next (typically from about 0.008" to about 0.010", depending on the material of the workpiece).

It will thus be found that the shank according to the present invention enables the use of inserts having cutting edges of any desired configuration for cutting a groove of the desired depth and configuration as well as inserts of any desired width for cutting a thread pattern having the desired spacing between adjacent grooves. Replacement of damaged cutting edges will also be relatively easy and inexpensive since only worn cutting edges need be replaced, leaving the still-usable cutting edges for further use.

As preferably embodied, cutting assembly 14 includes a single clamp (designated generally at 24) adapted to be mounted to shank 12 for securely clamping all the inserts against movement having the threading operation. For this purpose, clamp 24 is formed with a base portion (25a) adapted to be secured to the shank head (12b) and a plurality (equal in number to the number of inserts 16) of clamping fingers (each designated 25b), each finger adapted to clamp one insert against seating surface 20. Advantageously, clamp 24 is integrally formed like a "piano" clamp, with adjacent fingers (25b) spaced from each other but jointed by a common web—base portion 25a.

In order to fasten clamp 24 to shank head 12b, base portion 25a is formed with two holes (each indicated at 26) which need not be threaded. The shank head is formed with two threaded holes (each designated 28) which are positioned for alignment with holes 26 on the clamp when the clamp is secured to the shank. Each threaded hole 28 is proportioned for threadably receiving a threaded fastener (each designated 30) to secure clamp 24 to the shank. The lengths of fingers 25b are proportioned so that when clamp 24 is secured to the shank, the clamping portion of each clamping finger (i.e., the slightly projecting shoulder indicated at 25c) extends over the seating surface 20 (as indicated in FIG. 1). Each insert will thereby be clamped in a vice-like grip between the seating surface and the shoulder of its corresponding clamping finger.

Advantageously, alignment means are provided between the clamp (24) and the shank head (12b) for ensuring that the shoulder portion (25c) of each clamping finger (25b) is properly positioned over its corresponding insert (16). As here embodied, such alignment means comprise a slot-like key-way (32) formed in the shank and proportioned to receive the rib-like key (34) formed on the bottom surface of the base portion (25a) of clamp 24. Alignment is thereby accomplished by positioning the inside surface (designated 35) of key 34 in abutting relation with the oppositely facing surface (designated 33) of key-way 32. Clamping fingers 25b will, therefore, be squared relative to key-way surface 35 and properly positioned over their corresponding inserts.

The depth of key-way 32 is preferably slightly less than the height of key 34 which can, thereby, act as heel-like fulcrum when clamp 24 is secured to the shank. In addition, the top surface of clamp 24 is preferably inclined at a slight angle ($\alpha$ in FIGS. 2 and 7) with respect to the bottom edge of key/rib 34 or some other suitable reference surface on the assembled tool). In this way, as each threaded fastener 30 is threaded into its corresponding hole 28, the bottom portion of the screw head which is closest to the cutting edges will engage the top surface of clamp 24 first, so that the clamping force generated by the fastener head will be concentrated at a point as far as possible away from the heel-/pivot (i.e., key 34) thereby maximizing the clamping forces on the inserts by the resultant leverage-like action.

Since cut-out 18 extends all the way to the front edge of shank head 12b, the most forward front edge (12c) of the shank is formed with a threaded hole (36), extending parallel to the axis of the shank and adapted to enable attachment of an end clamp (designated generally by 38) to secure all the inserts (16) against the front-facing surface (12d) formed by cut-out 18. It will be understood that end clamp 38 prevents movement of the inserts in any direction parallel to seating surface 20.

Here, end clamp 38 includes threaded fastener 40 (which may be any standard clamp screw) and finger clamp 42. Finger clamp 42 may include a small projecting portion (not shown) formed on its underside, adapted to be received in the notch portion (36a) of hole 36 for aligning the clamping finger to properly engage the inserts. It will be understood that the clamping finger is formed with a slightly projecting shoulder portion similar to shoulder 25c of clamping fingers 25b for ensuring good clamping action against the group of inserts.

Turning now to FIGS. 8 and 9, there is shown a preferred embodiment of one insert 16 for use with the present invention. As here embodied, each insert (made of a hardened material such as tungsten-carbide) is shaped like a diamond profile cutting insert (when viewed from the side as in FIG. 8), except that it is adapted to stand on edge. Thus, the insert is formed with a substantially flat bottom (16a) and flat top (16b), with the front edge (16c) sloping rearwardly under its cutting edge (17). By this configuration, the insert can be double-ended and have a second cutting edge formed at the intersection of bottom wall 16a and the insert back edge (16d) which slopes under that cutting edge, all as shown in FIGS. 8 and 9. It will be understood that the sidewall portions (each designated 17a) of the insert directly under each cutting edge are tapered inwardly to prevent scrubbing between surfaces of the insert and the groove cut in the workpiece.

Figure 4:
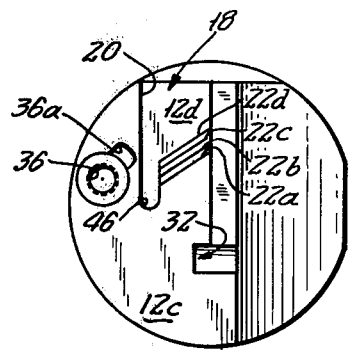
FIG. 4 is an end view (similar to FIG. 2) of the shank shown in FIG. 3.
Figure 5:
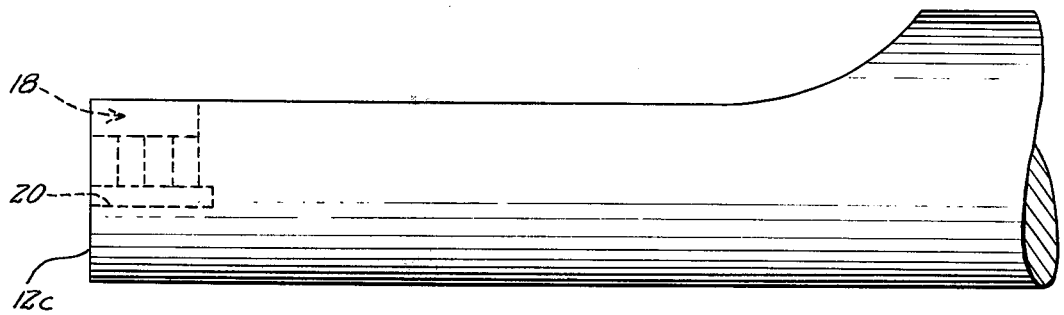
FIG. 5 is a side view of the shank shown in FIG. 3.
Figure 7:
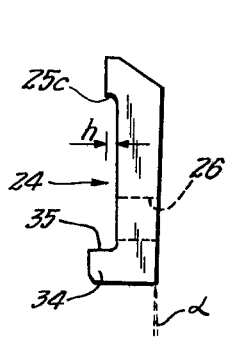
FIG. 7 is a side view of the clamp shown in FIG. 6.
Figure 6:
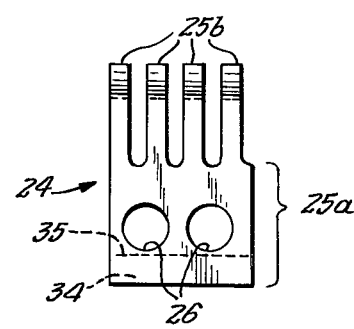
FIG. 6 is a plan view of the clamp member used with the embodiment shown in FIG. 1.

It will also be understood that for the inserts disclosed with reference to FIGS. 8 and 9, the corresponding bearing or back-stop surfaces (i.e., surfaces 22a-22d) will be canted at virtually the identical angle (preferably an acute angle) relative to seating surface 20 as the angle of the back walls 16d relative to bottom edges 16a (as well as, of course, the angle between front walls 16c and top edges 16b for double-ended inserts), as shown in FIGS. 2 and 4. Since, when the inserts are installed, the bearing surface segments (22a-22d) extend over the rear edges (16d) of inserts, the back ends of the inserts are wedged farther into the vertex of intersection of the seating surface 20 with the bearing surface segments to enhance the back-stop function performed by surface segments 22a-22d. Moreover, since the entire rear edge (16d) of each insert abuts a bearing surface, there is minimal risk that an insert (particularly a double-edged insert) will cut into or damage the bearing surface segments of the shank.

In an exemplary embodiment, insert 16 is a 55° diamond-shaped insert and all the bearing surfaces (22a-22d) form an angle of about 55° with the seating surface (20). In addition, the seating surface is positioned so that when all the inserts are clamped in place, all the cutting edges (17) fall on the centerline ( ) of the shank as indicated in FIG. 2. Each insert is about 0.25" wide and the angle of the V-shaped cutting edge is about 60°, with a flat portion (extending width-wise) about 0.03" long at the vertex of the "V. " The fingers of "piano" clamp 24 may be about 0.15" wide and spaced about 0.1" apart and the height (indicated at h in FIG. 7) of each shoulder 25c may be about 0.06". The angle, $\alpha$, formed by the top surface of clamp 24 and the vertical is about 1°-2° and the width (W in FIG. 3) of pocket 18 is about 1".

It will be understood that each shoulder portions (25c) of clamping fingers 25b should engage a top edge of its corresponding insert at a point over which a substantial portion (about 50% or more) of the insert bottom edge (16a) abuts seating surface 20 directly below the shoulder portion, as indicated in FIG. 2. It will also be understood that the usual bores (indicated, e.g., at 44 and 46) may be formed in the shank to facilitate milling the shank to form key-way 32 and bearing surfaces 22a–22d, respectively.

It will be appreciated by those skilled in the art that the tool assembly embodied in FIGS. 1–9, enables easy interchange of any cutting edge simply by reversing the insert with the damaged cutting edge, or replacing the insert if both cutting edges are damaged or if the insert has only a single cutting edge. The other inserts can remain in place for continued use and, since the inserts are secured by only two clamps, replacement of inserts is extremely easy, as there are no back-up blocks or other structures which must be carefully replaced. Moreover, instead of requiring 15 to 20 passes, threading can be completed in about 7 to 9 passes and possibly fewer depending on the workpiece material and the depth of the thread.

By enabling the use of a set of identical inserts, the present invention provides automatic indexability despite replacement or reversing of inserts. Moreover, the tool assembly according to the invention can be used in accordance with any otherwise conventional machining techniques, e.g., approaching the workpiece at an angle of about 28° to about 30° on successive passes, to avoid chattering.

Turning now to FIGS. 10–13, there are shown various views of a threading tool assembly according to a modified aspect of the invention. According to this aspect, the edge of the seating surface (20″) over which the cutting edges of the inserts project and the lengths of the clamping fingers (25b′) of its associated clamp (24′) are formed at angles corresponding to the angle defined generally by the ascending stagger of the insert cutting edges.

As here embodied, the shank (12′), which is a square shank tool, has a generally rectangular butt portion (12a′) and a club-head front portion (12b′). It is formed with a cut-out, or pocket (18′) in the shank head, similar to pocket 18 described above with reference to FIGS. 1–7. Thus, seating surface 20′ provides a base upon which the inserts are supported and the step-like bearing surface segments (22a′, 22b′ 22c′ and 22d′) provide the back-stop against which the rear edges of their corresponding inserts (16) abut when secured in place to define the ascending stagger-like configuration of the cutting edges, all substantially as described above with reference to FIGS. 1–7.

However, instead of being straight, the edge (designated 13′ in FIGS. 11 and 12) of surface 20′ over which the cutting edges project when clamped in place is set at an angle (indicated at $\beta$ in FIG. 11) with respect to the longitudinal axis of the shank (12′). Angle $\beta$ is preferably equal to about the angle made between the longitudinal axis and a line passing through corresponding points on successive cutting edges of the inserts—i.e., the desired angle of ascent of the insert cutting edges, which may be about 10°. In this way, the bottom edge (16a) of every insert will abut approximately the same amount of surface area of support surface 20′ to ensure consistent clamping action on all the inserts by the shoulder portions (25c′) of clamp 24′.

The clamp (24′) for the embodiment of FIGS. 10–13 is similar to clamp 24 described above except that it is formed with progressively longer clamping fingers 25b′, as best shown in FIGS. 10 and 13. Each insert will, thus, be gripped at correspondingly similar locations by a portion of seating surface 20′ and a shoulder portion (25c′) of its clamping fingers 25b′.

As preferably embodied, the fastening-accommodating holes (26′) formed in clamp base portion 25a′ and the threaded holes in shank head 12b′ are slightly offset relative to each other, as shown in FIGS. 11 and 13. That is, the hole closest to butt portion 12a′ is located slightly closer (relative to the longitudinal axis of shank 12′) to edge 13′ than the hole closest to front edge 12c′, so that each hole is about the same distance from edge 13′. Thus, the clamping force exerted by all the clamping fingers will be essentially the same.

It will be understood that insert 16 described with reference to FIGS. 8 and 9 is used with the embodiment disclosed in FIGS. 10–13 and key-way 32′ and key 34′ are essentially the same as the key-way and key described with reference to FIGS. 1–7. Similarly, threaded hole/notch 36′/36a′ is essentially identical to that described with reference to FIGS. 1–7, and the end clamp (38′) is essentially identical to end clamp 38 described above.

Although the aspect disclosed with reference to FIGS. 10–13 offers the advantages disclosed herein, the arrangement disclosed with reference to FIGS. 1–7 may be preferable since it is less costly to fabricate and the clamping action on the inserts is sufficient to prevent displacement or movement of any insert.

It will be readily appreciated by those skilled in the art that the invention in its broader aspects is not limited to the specific embodiments herein shown and described. For example, the embodiments described herein may be adapted for external threading simply by reorienting pocket 18 (and 18′) by 90° so that the cutting edges project outwardly from the front end edge of the shank.

Thus, variations may be made from these embodiments, which are within the scope of the accompanying claims, without departing from the principles of the invention or sacrificing its chief advantages.

What is claimed is:

1. A tool assembly for machine tools, such as lathes and the like, for forming a helical thread or a groove on a workpiece, particularly on the interior surface of a hollow workpiece, which comprises:

a generally elongate shank having a head portion formed at one end and a butt portion at its other end for mounting to the machine tool, the head portion of said shank being formed with a notch-like cut-out providing an abutment surface extending generally perpendicular to the longitudinal axis of the shank, a seating surface and a plurality of bearing surface segments, each bearing surface segment extending at an angle with respect to the seating surface while said seating surface and said bearing surface segments are generally perpendicular to said abutment surface, said notch-like cut-out extending from said abutment surface to the end edge of said head portion, and said bearing surface segments being formed in generally ascending step-like configuration beginning at the end edge of said head portion;

a plurality of cutting inserts which are of essentially the same length, each said insert having a cutting edge on at least one end and having its other end adapted to bear against one of said bearing surface segments and having its bottom surface adapted to be supported by said seating surface during operation of the machine tool;

a first clamp member adapted to be secured to said shank, said first clamp member having a plurality of clamping fingers, said plurality of clamping fingers corresponding in number to the number of said bearing surface segments, said clamping fingers adapted to hold said inserts against said seating surface during operation of the machine tool when said first clamping member is secured to said shank;

first fastening means for tighteningly securing said first clamp member to said shank to hold said cutter inserts securely in place during operation of the machine tool;

an end clamp member adapted to be mounted to the end edge of said shank at the head thereof, said end clamp member including at least one finger-like member adapted to clamp all the cutting inserts against said abutment surface when said end clamp member is secured to said shank;

second fastening means for tighteningly securing said end clamp member to said shank to hold said cutter inerts in place during operation of the machine tool, each said cutter insert being mounted to said shank with an end abutting a said bearing surface segment and oriented to extend essentially perpendicular to the longitudinal axis of the shank, the cutting edge of each said cutter insert projecting beyond an edge of said shank defined along said seating surface and all said cutting edges generally defining a line which forms an acute angle with the longitudinal axis of said shank, the cutting edge of the first insert to contact the workpiece being spaced the least distance from the longitudinal axis of the shank, such that as each successive cutter insert contacts the workpiece, the groove cut by each preceding insert is enlarged.

2. The tool assembly according to claim 1, wherein said clamping fingers extend to progressively longer lengths in ascending order starting with the clamping finger corresponding to the insert having the first cutting edge to contact the workpiece, such that each said insert is engaged by its corresponding clamping finger at generally the same corresponding point.

3. The tool assembly according to claim 2, wherein the side edge of said shank, over which the cutting edges of said inserts project when clamped against said seating surface, extends at essentially the same acute angle with respect to the longitudinal axis of said shank as the line defined by the cutting edges of said inserts, such that the area of said seating surface adjacent each insert is approximately equal.

4. The tool assembly according to claim 3, wherein said first clamp is attached to said shank by at least two threaded fasteners, each inserted through a hole formed in said first clamp and threaded into a threaded hole formed in said shank, the rear-most set of aligned holes being closer, relative to the longitudinal axis, to said shank side edge than the front-most pair such that both sets of holes are equidistant from said shank side edge for equalizing the clamping force exerted on all said inserts.

5. The tool assembly according to claim 1, wherein said bearing surface means are inclined at an acute angle with respect to said seating surface and wherein the back edges of said insert abutting said bearing surface means are inclined at essentially the same acute angle such that the inserts are urged into further abutting relation with said bearing surface means when the cutting edges are in contact with the workpiece to help prevent movement of the inserts during operation of the machine.

6. The tool assembly according to claim 5, wherein said inserts are generally diamond shaped inserts adapted to stand on edge.

7. The tool assembly according to claim 6, wherein said inserts have a cutting edge on both ends.

8. The tool assembly according to claim 1, wherein said first clamp includes a rib-like key extending from a portion thereof to be located adjacent said shank, and said shank includes a slot-like key-way adapted to receive said key for aligning said clamping fingers over said inserts.

* * * * *